US010757218B2

(12) United States Patent
Zhao et al.

(10) Patent No.: US 10,757,218 B2
(45) Date of Patent: Aug. 25, 2020

(54) METHOD AND APPARATUS FOR GENERATING PUSH NOTIFICATIONS

(71) Applicant: ALIBABA GROUP HOLDING LIMITED, George Town, Grand Cayman (KY)

(72) Inventors: Huasha Zhao, San Mateo, CA (US); Xiaogang Li, San Mateo, CA (US); Qiong Zhang, San Mateo, CA (US); Luo Si, San Mateo, CA (US); Zhenyu Gu, San Mateo, CA (US); Qiyu Zhang, San Mateo, CA (US)

(73) Assignee: ALIBABA GROUP HOLDING LIMITED, Gearge Town, Grand Cayman (KY)

( * ) Notice: Subject to any disclaimer, the term of this patent is extended or adjusted under 35 U.S.C. 154(b) by 698 days.

(21) Appl. No.: 15/473,442

(22) Filed: Mar. 29, 2017

(65) Prior Publication Data
US 2018/0285730 A1    Oct. 4, 2018

(51) Int. Cl.
*H04L 29/08*   (2006.01)
*G06N 3/08*    (2006.01)
(Continued)

(52) U.S. Cl.
CPC ............. *H04L 67/306* (2013.01); *G06N 3/08* (2013.01); *G06N 5/022* (2013.01); *H04L 67/22* (2013.01);
(Continued)

(58) Field of Classification Search
None
See application file for complete search history.

(56) References Cited

U.S. PATENT DOCUMENTS

| 6,980,993 B2 | 12/2005 | Horvitz et al. |
| 7,801,956 B1 | 9/2010 | Cumberbatch et al. |
| (Continued) | | |

FOREIGN PATENT DOCUMENTS

| JP | 2007135105 A | 5/2007 |
| WO | WO 2011/067675 A2 | 6/2011 |

OTHER PUBLICATIONS

'How exactly does word2vec work': Meyer, 2016, UNiversity Oregon.*
(Continued)

*Primary Examiner* — Li B. Zhen
*Assistant Examiner* — Peter Coughlan
(74) *Attorney, Agent, or Firm* — Finnegan, Henderson, Farabow, Garrett & Dunner, LLP

(57) ABSTRACT

A method for generating one or more push notifications to a user device is described. The method comprises: obtaining history data representing a history of online activities of a user and candidate data representing a set of candidate information; generating, based on the history data and the candidate data, user profile vectors representing a user profile associated with the user and content vectors representing a set of content profiles associated with the set of candidate information; generating, based on a machine learning model trained with a history of online activities, embedding user feature vectors and embedding content feature vectors based on the history data and the candidate data; and providing for transmission information for one or more push notifications including first candidate information of to a user device associated with the user, the first candidate information being determined from the set of candidate information based on the aforementioned vectors.

20 Claims, 11 Drawing Sheets

(51) Int. Cl.
*G06N 5/02* (2006.01)
*G06N 3/04* (2006.01)
*G06N 7/00* (2006.01)

(52) U.S. Cl.
CPC ............ *H04L 67/26* (2013.01); *G06N 3/0481* (2013.01); *G06N 7/005* (2013.01)

(56) References Cited

U.S. PATENT DOCUMENTS

| | | |
|---|---|---|
| 9,509,857 B2 | 11/2016 | O'Connor et al. |
| 2004/0181604 A1 | 9/2004 | Immonen |
| 2006/0133586 A1 | 6/2006 | Kasai et al. |
| 2010/0250556 A1 | 9/2010 | Park et al. |
| 2011/0016121 A1* | 1/2011 | Sambrani ............... G06Q 30/02 707/734 |
| 2011/0029464 A1* | 2/2011 | Zhang ................... G06N 20/00 706/12 |
| 2013/0047034 A1* | 2/2013 | Salomon ................. H04W 4/00 714/18 |
| 2013/0268353 A1 | 10/2013 | Zeto, III et al. |
| 2014/0108153 A1 | 4/2014 | Matus |
| 2014/0143325 A1 | 5/2014 | Lessin et al. |
| 2014/0279014 A1 | 9/2014 | Roka et al. |
| 2016/0170991 A1 | 6/2016 | Birchall et al. |
| 2016/0259857 A1 | 9/2016 | Wang et al. |
| 2016/0359791 A1* | 12/2016 | Zhang ................... H04L 51/32 |

OTHER PUBLICATIONS

Notification of Transmittal of the International Search Report and the Written Opinion of the International Searching Authority, or Declaration, International Application No. PCT/US18/24949, dated Jun. 8, 2018, 15 pages.

\* cited by examiner

| User A | |
|---|---|
| Keyword Profile | Category profile |
| "nature" "SuperShot" "hiking" "rabbit" | "camera" "nature" |

140

| Webpage A | |
|---|---|
| Keyword Profile | Category profile |
| "rabbit" "contrast ratio" "Yosemite" | "photography" "nature" |

150

| Keywords | Categories |
|---|---|
| SuperShot | camera |
| rabbit, Yosemite, hiking | nature |
| Contrast ratio | photography |

| | "Yosemite" | "photography" | "nature" | "rabbit" | "hiking" | "Supershot" |
|---|---|---|---|---|---|---|
| User A keyword profile | 0 | 0 | 1 | 1 | 1 | 1 |
| Webpage A keyword profile | 1 | 1 | 0 | 1 | 0 | 1 |

| Item 1 | Content 1 | Item 4 | Item 6 | Content 6 | Item 9 | Content 9 | ... |
|---|---|---|---|---|---|---|---|
| 1 | 1 | 0 | 0 | 0 | 0 | 0 | |
| 0 | 1 | 1 | 0 | 0 | 0 | 0 | |
| 0 | 0 | 1 | 1 | 0 | 0 | 0 | |
| 0 | 0 | 0 | 1 | 1 | 0 | 0 | |

METHOD AND APPARATUS FOR GENERATING PUSH NOTIFICATIONS

TECHNICAL FIELD

The present disclosure generally relates to the field of computer software, and more particularly, to a method and an apparatus for generating push notifications.

BACKGROUND

Push notifications generally refer to providing predetermined information to a user without receiving a request from the user for the information. The predetermined information is typically generated by a remote server and pushed to a user device, which then provides the received information over a software interface (e.g., a display interface, an audio interface, etc.). The content of the predetermined information can be tied to the usage history of a specific software application. For example, a social network application may generate push notifications that recommend candidates for networking to a user, based on the information of the persons who are already in the user's social network. However, such an application may not generate the push notifications based on the user's activities in other contexts, or with other software applications. As a result, the push notification may include formation that the user does not need, leading to poor user experience, as well as waste of computation and network resources used for providing the push notification.

SUMMARY

Embodiments of the present disclosure provide a method for generating one or more push notifications to a user device. The method can be performed by one or more servers having one or more processors. The method may comprise obtaining history data representing a history of online activities of a user, obtaining candidate data representing a set of candidate information to be selected in one or more push notifications to the user, and generating, based on the history data and the candidate data, user profile vectors representing a user profile associated with the user and candidate vectors representing a set of content profiles associated with the set of candidate information. The method may further comprise generating, with a machine learning model, embedding user feature vectors of the user and embedding content feature vectors of the set of candidate information based on the history data and the candidate data, wherein the machine learning model is trained with a history of online activities of a plurality of users tracked by the one or more servers, determining a first relationship between the user profile vectors and the content vectors and a second relationship between the embedding user feature vectors and the embedding content feature vectors, selecting first candidate information from the set of candidate information based on a weighted combination of the first and second relationships, and providing for transmission information for one or more push notifications including the first candidate information to a user device associated with the user.

Embodiments of the present disclosure also provide an apparatus for generating one or more push notifications to a user device. The apparatus may comprise a feature extraction module, an embedding feature generation module, a similarity module, and a notifications generation module. The feature extraction module is configured to obtain history data representing a history of online activities of a user, obtain candidate data representing a set of candidate information to be selected in one or more push notifications to the user, and generate, based on the history data and the candidate data, user profile vectors representing a user profile associated with the user and content vectors representing a set of content profiles associated with the set of candidate information. The embedding feature generation module is configured to obtain the history data and the candidate data, and generate, with a machine learning model, embedding user feature vectors of the user and embedding content feature vectors of the set of candidate information based on the history data and the candidate data, wherein the machine learning model is trained with a history of online activities of a plurality of users tracked by the one or more servers. The similarity module is configured to determine a first relationship between the user profile vectors and the content vectors and a second relationship between the embedding user feature vectors and the embedding content feature vectors, and select first candidate information from the set of candidate information based on a combination of the first and second relationships. The notifications generation module is configured to provide for transmission information for one or more push notifications including the first candidate information to a user device associated with the user.

Embodiments of the present disclosure also provide a non-transitory computer readable medium that stores a set of instructions that is executable by at least one hardware processor of an apparatus to cause the apparatus to perform a method of generating one or more push notifications to a user device. The method may comprise obtaining history data representing a history of online activities of a user, obtaining candidate data representing a set of candidate information to be selected in one or more push notifications to the user, and generating, based on the history data and the candidate data, user profile vectors representing a user profile associated with the user and content vectors representing a set of content profiles associated with the set of candidate information. The method may further comprise generating, with a machine learning model, embedding user feature vectors of the user and embedding content feature vectors of the set of candidate information based on the history data and the candidate data, wherein the machine learning model is trained with a history of online activities of a plurality of users tracked by the one or more servers. The method may further comprise determining a first relationship between the first and second vectors and a second relationship between the embedding user feature vectors and the embedding content feature vectors, selecting first candidate information from the set of candidate information based on a weighted combination of the first and second relationships, and providing for transmission information for one or more push notifications including the first candidate information to a user device associated with the user.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIGS. 2A-2C are blocks diagrams illustrating a subsystem of the exemplary system of FIGS. 1A-1B.

FIGS. 3A-3D are blocks diagrams illustrating another sub-system of the exemplary system of FIGS. 1A-11B.

DESCRIPTION OF THE EMBODIMENTS

Figure 1A:
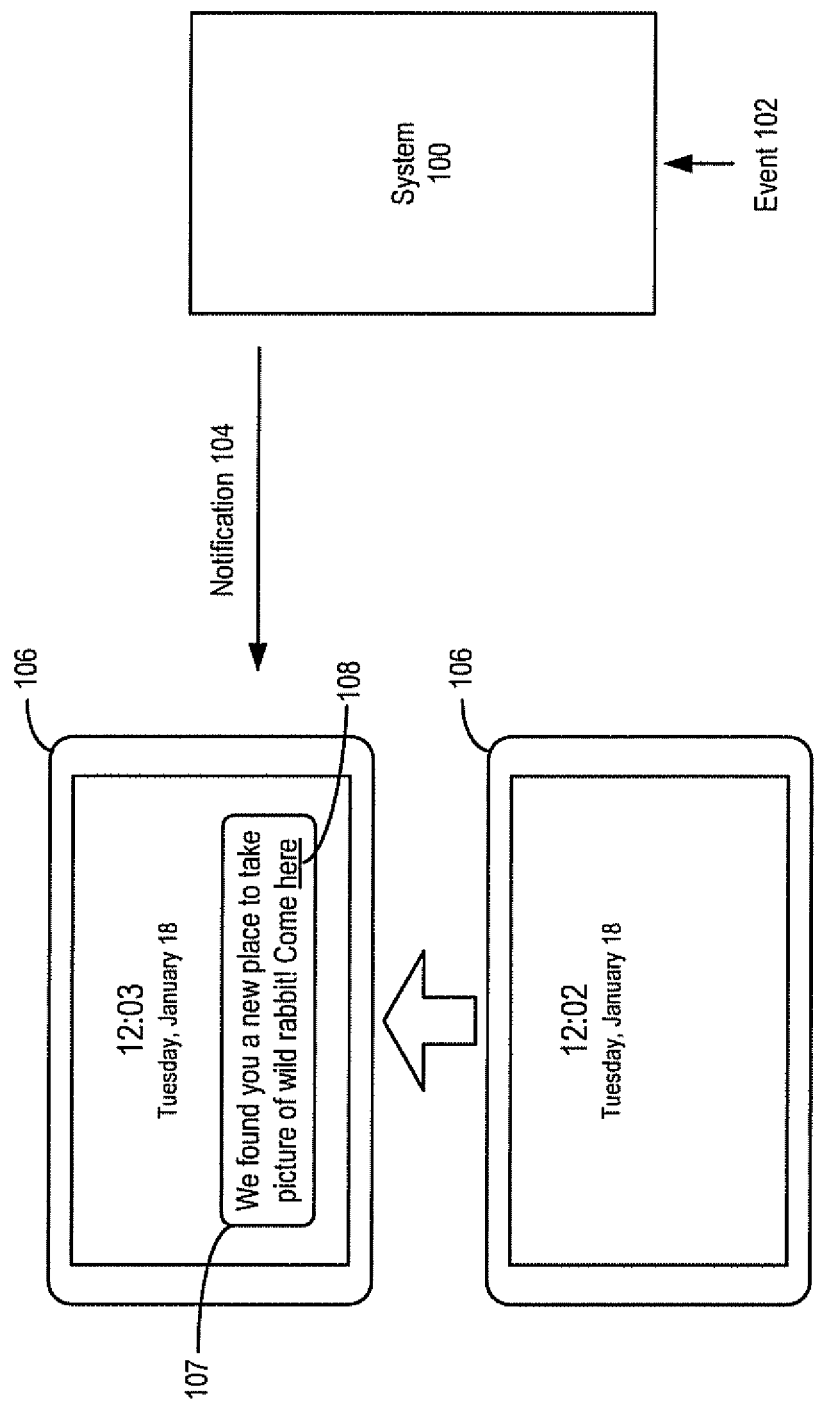
FIGS. 1A-1B are block diagrams illustrating an exemplary system for generating push notifications consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a push notifications system that determines notifications information to be pushed to a user based on history data of the user's online activities, which include but are not limited to prior search queries provided by the user, a set of webpages visited by the user that covers various categories of information items, activities taken by the user with respect to those information items, etc. The push notifications system can determine, based on the history, a set of user features that can provide an estimation of user's interest. The push notifications system can then determine notifications information related to user features, to improve the likelihood that the notifications information aligns with the user's interest.

Embodiments of the present disclosure also use a machine learning algorithm that is trained based on history data of the user's online activities, as well as history data of other users' online activities, to extract embedding features from a set of candidate information. The machine learning algorithm can be trained to generate the embedding features of the set of candidate information by relating the candidate information with a set of activities taken by the user and other users (e.g., selecting a particular product, a service, etc.) that occur within a predetermined timing window as when the candidate information was accessed. Given that typically the activities of a user can be good indicators of the user's intents and interests, the embedding features of the candidate information can provide an alternative estimation of, for example, whether a user who has selected a particular product or service will be interested in the candidate information. The trained machine learning algorithm can also generate a set of embedding features of a user based on a set of activities taken by the user and a set of content information accessed by the user. The relationship between the embedding features of the user and the candidate information can provide an alternative estimation of user's interest in the candidate information, and can be taken into account to determine whether or not to push certain candidate information to the user.

By taking into consideration the history data of users' activities with respect to a set of webpages that covers various categories of information items, embodiments of the present disclosure can estimate or predict a user's interest based on a wider set of data. With such an arrangement, push notifications information can be generated from a more diverse source of information. The notifications information is also more likely to be aligned with the interest of a particular user. As a result, the utility of the push notifications, as well as the user experience, can be improved. Moreover, embodiments of the present disclosure can also reduce the likelihood of waste of computation and network resources in generating and transmitting push notifications that a user does not need, therefore improving the utilization of computation and network resources.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Reference is now made to FIG. 1A, which illustrates an exemplary system 100 for providing push notifications, consistent with embodiments of the present disclosure. System 100 can include one or more computer servers that form a part of a cloud-based data processing platform. As shown in FIG. 1A, system 100 may receive an event 102 which can trigger the generation of push notifications 104.

Event 102 can be generated by various sources and based on detection of various events. For example, event 102 may be a user device 106, internally within system 100, or by another system not shown in FIG. 1A. For example, user device 106 may be installed with a mobile app. The mobile app can transmit a message to system 100 to trigger the generation of push notifications 104. As another example, a third-party server (not shown in FIG. 1A) can also transmit a message to system 100 to trigger the generation of push notifications 104. In both cases, the reception of the message by system 100 can be event 102. As another example, event 102 can also be generated internally within system 100, with or without receiving a message from user device 106 or from the third-party server.

Event 102 can also be generated based on detection of various events. For example, the mobile app in user device 106, system 100, or another third-party server may detect other events including, for example, an expiration of a timer device, a change in the operation state of user device 106 (e.g., a power-on event, a log-in event, etc.), an entry of user device 106 into a particular geographical location, Wi-Fi area, etc., to generate event 102.

After receiving event 102, system 100 may generate and transmit push notification 104 to user device 106, which can output the push notification via various hardware interfaces. For example, as shown in FIG. 1A, push notification 104 is displayed as a message 107 via a display interface. Message 107 also includes a link 108 that provides access to additional content (e.g., a webpage).

In some embodiments, system 100 determines the content of push notification 104 (e.g., message 107, additional content linked to link 108, etc.) based on history data of a user's online activities, which include but are not limited to prior search queries provided by the user, a set of webpages visited by the user that covers various categories of information items, activities taken by the user with respect to those information items, etc. As illustrative examples, the prior search queries can include a set of keywords provided by the user to a search engine to perform a search for information. The set of webpages may cover reviews and discussions regarding an information item. The information item may include, for example, a particular activity (e.g., outdoor photography), a particular product or service (e.g., a particular model of camera, camera accessories, etc.). The action taken by the user may include, for example, a selection of a particular activity, product, or service, etc. System 100 may also employ a model, which may include a deep neural network, to process the user's history and a set of candidate information (e.g., titles and metadata associated with a set of webpages) to extract embedding features representing the user as well as the set of candidate information. The deep neural network can be in the form of a skip-gram model trained by a historical sequence of activities by the user and by other users. With the historical sequence providing a context, system 100 can extract embedding features of the user that reflect the user's interest, as well as embedding features of candidate information that reflect the user's (or other users') likely perception of the candidate information. Based on these embedding features, system 100 can determine that some of the candidate information is more likely to be of interest to the user, and include such candidate information in push notifications 104.

As an illustrative example, based on a determination that a user has a history of searching and acquiring information about cameras and the nature, as well as a history of purchasing a camera and its accessories, system 100 may determine that the user is likely to be interested in receiving information about taking pictures at a wild habitat. System 100 can then generate push notifications 104 to include such information, and may insert additional content (e.g., link 108 to a webpage) that includes such information in push notifications 104 as well, as shown in FIG. 1A.

By taking into consideration the history data of users' activities with respect to a set of webpages that covers various categories of information items, embodiments of the present disclosure can estimate or predict the user's interest based on a wider set of data. With such an arrangement, push notifications information can be generated from a more diverse source of information. The notifications information is also more likely to be aligned with the interest of a particular user. As a result, the utility of the push notifications, as well as the user experience, can be improved.

Figure 1B:
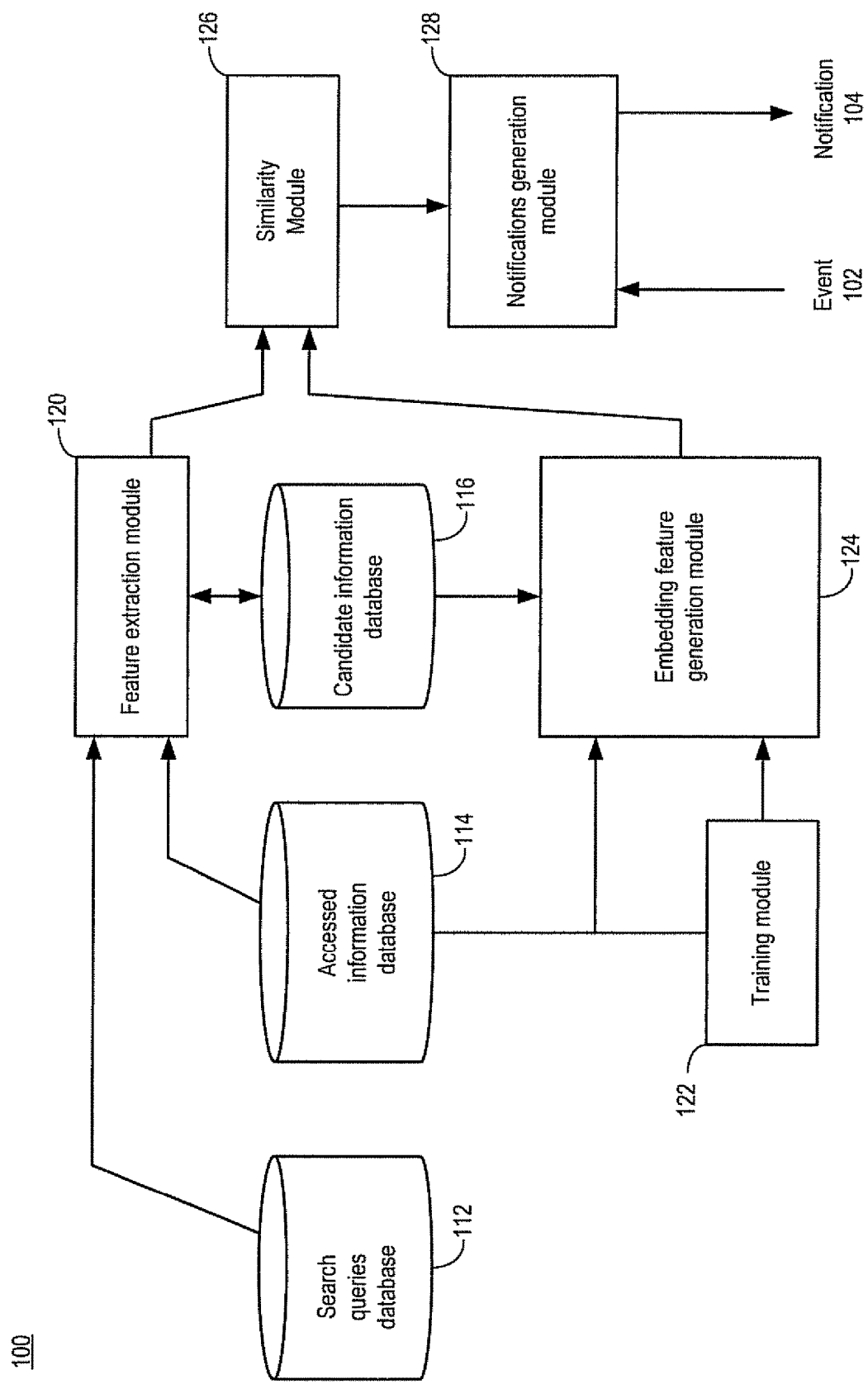

Reference is now made to FIG. 1B, which illustrates the exemplary components of system 100 consistent with embodiments of the present disclosure. As shown in FIG. 1B, system 100 includes a search queries database 112, an accessed information database 114, and a candidate information database 116. Although FIG. 1B shows that these databases are separate repository, it is understood that they can also be part of a single data repository. Search queries database 112 may store a set of search queries previously provided by the users to a search engine on an Internet browser, which can provide the search queries to system 100 for storage in search queries database 112. Accessed information database 114 may store information related to a set of webpages previously visited by users, as well as activities taken by the users with respect to information items included in those webpages. As an illustrative example, some users may have visited, using an Internet browser, a set of webpages related to cameras and wildlife protections. Some users may also have made a purchase of a camera, made a booking for air tickets to visit a national park, etc., via the Internet browser. The Internet browser may capture those activities (e.g., with cookies), and provide a log of those activities to accessed information database 114 for storage. Candidate information database 116 may store a set of candidate information which can be selected for push notifications 104. The candidate information may include, for example, a set of content identifiers, titles, metadata, content, etc. associated with a set of webpages that are potentially of interest to a particular user, as well as information items (e.g., product, service, off-line activities) referred to by the set of webpages. Each of these webpages can be linked to candidate information database 116, which allows them to be retrieved and processed by other components of system 100.

Moreover, in both accessed information database 114 and candidate information database 116, each information item and webpage can also be associated with, respectively, an item identifier and a content identifier. As to be discussed in more details below, these identifiers allow system 100 to assemble a sequence of access of the information items and webpages for training a machine learning model included in embedding feature generation module 124, for estimation of user interest.

System 100 further includes a feature extraction module 120, a training module 122, an embedding feature generation module 124, a similarity module 126, and a notifications generation module 128. As to be discussed in more details below, these modules can estimate the interests of a particular user based on the information stored in search queries database 112 and accessed information database 114, and then select a piece of candidate information from candidate information database 116 for pushing to user device 106 associated with that user.

In general, the word "module," as used herein, can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Feature extraction module 120 can generate a set of user features that represent a user, and a set of content features representing a piece of candidate information (e.g., a webpage), based on information stored in search queries database 112, accessed information database 114, and candidate information database 116. The user features may include a set of text keywords extracted from the user search queries, as well as information accessed by the user including, for example, the title of a webpage, the title of an information item accessed by the user (e.g., an activity, a product, or a service selected by the user), etc. The user features may also include a set of predetermined categories associated with the information item accessed by the user. These user features may provide indications of the information content and a particular category of an information item (e.g., a product, a service, an activity, etc.) that mostly likely interests a particular user.

Moreover, the content features may also include a set of text keywords extracted from the candidate information (e.g., title of a webpage, the titles of information items discussed or linked in the webpage, etc.). The content features may also include a set of predetermined categories associated with the titles of information items discussed or linked in the candidate information. These features can be represented in vector forms, and a similarity determination (e.g., based on a cosine distance) can be made between the vectors representing the user features and the content features. A degree of user interest in the candidate information can also be estimated based on the similarity determination.

Figure 2A:
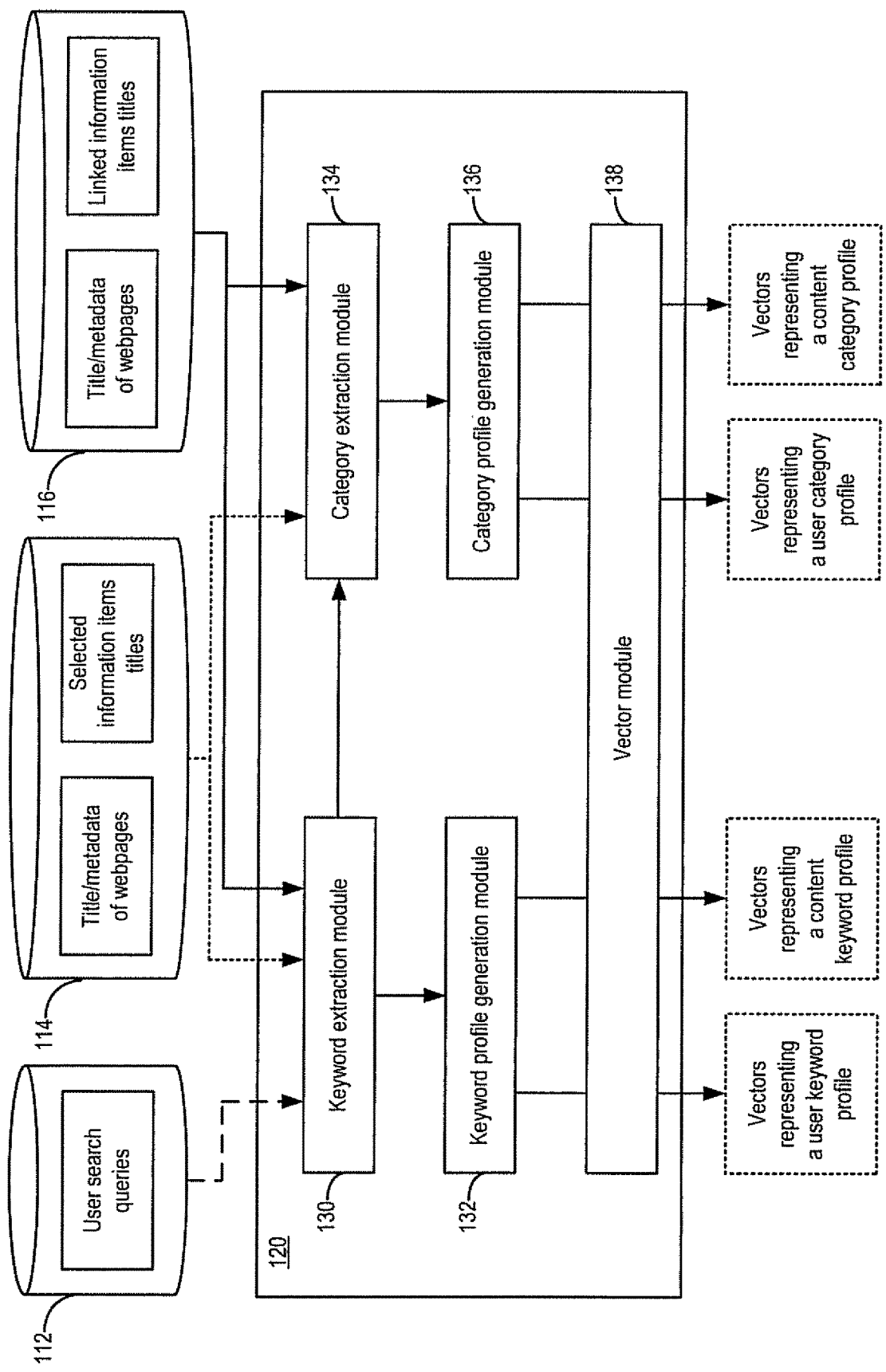

Reference is now made to FIG. 2A, which illustrates the exemplary subcomponents of feature extraction module 120, consistent with embodiments of the present disclosure. As shown in FIG. 2A, feature extraction module 120 includes a keyword extraction module 130, a keyword profile generation module 132, a category extraction module 134, a category profile generation module 136, and a vector module 138.

Keyword extraction module 130 may perform processing of the text data included in one or more text processing algorithms to extract keywords from the text data representing user search queries, user selected information items titles, title or meta data of a webpage visited by a user (or by other users), and titles of information items discussed or linked in the webpage. The text processing algorithms may include, for example, parsing the text data and then generating word segmentations from the parsed text data using conditional random fields. The algorithms may also include various cleansing procedures to remove duplicate words or phrases and to ignore transition words.

Keyword profile generation module 132 can generate a user keyword profile and a content keyword profile based on the keywords extracted by keyword extraction module 130. For example, keyword profile generation module 132 can accumulate the keywords extracted from the search queries provided by a user, titles of information items selected by the user, the titles or metadata of webpages visited by the user, etc., to generate a user keyword profile associated with that user. The keywords extracted can also be associated with a predetermined period of time (e.g., within a week) in which the user inputs the search queries, selects the information items, or visits the webpages. The content keyword profile can include a set of keywords extracted from the title or metadata of various webpages, and/or from the titles of information items discussed or linked in these webpages. Data structures 140 and 150 of FIG. 2B illustrate exemplary keyword profiles of a user ("user A") and of a webpage ("webpage A").

Category extraction module 134 can generate a user category profile and a content category profile. The user category profile can include a set of predetermined categories associated with the titles of information items accessed by the user. The content category profile can also include a set of predetermined categories discussed or linked in the candidate information (e.g., a webpage). Each user can be associated with a user category profile. Moreover, each piece of candidate information (e.g., a webpage) included in candidate information database can be associated with a content category profile.

The determination of the category profile can be based on various methods. As an example, system 100 may maintain a keyword mapping table that maps a set of keywords to a set of categories, and the content profile can be determined based on the keywords extracted by keyword extraction module 130 and the mapping table. FIG. 2B illustrates an exemplary mapping table 160 that maps a set of keywords to different categories.

The determination of the category profile can also be based on tagging. As an example, a webpage can be associated with various tags related to the content of the webpage. The webpage may also include a set of mark-up tags associated with a particular portion of the content. These tags can be mapped to a set of categories in a tag mapping table similar to mapping table 160, and the category profile of the webpage can be determined based on these tags and the tag mapping table. Further, a category classifier can also be used to process the text data of a webpage (e.g., the title, the metadata, the content, etc.) to determine the category information. The category classifier can be based on machine learning from the processing of other webpages. For example, the category classifier can be trained to classify a set of webpages including the word "SuperShot" to be under the category "camera," and to reach the same conclusion when it detects the word "SuperShot" in a webpage to be classified.

Referring back to FIG. 2A, the keyword and category profiles generated by keyword profile generation module 132 and category profile generation module 136 can be provided to vector module 138, which can convert the profiles into vectors. A vector representing a profile can be a multi-dimensional vector, with each dimension being represented by a particular keyword or a category in the profile. FIG. 2C illustrates an exemplary table 170 that maps a keyword profile (e.g., user A keyword profile and webpage A keyword profile illustrated in FIG. 2B) to multi-dimensional vectors. For example, the vector value for a particular dimension (e.g., "Yosemite") can be set one if the keyword associated with that dimension is present, and can be set to zero if the keyword associated with that dimension is absent.

Referring back to FIG. 1B, feature extraction module 120 can transmit the vector representations of the user keyword and category profiles (associated with a particular user), as well as the vector representations of the content keyword and category profiles (associated with a set of webpages), to similarity module 126. Similarity module 126 can determine, based on these vectors, a similarity measurement that can be used to estimate a degree of interest of the particular user in the set of webpages. The similarity measurement can be based on, for example, a determination of a first cosine distance between a user keyword profile vector and a content keyword profile vector, and a second cosine distance between a user category profile vector and a content category profile vector. A cosine distance between the two vectors (denoted as y1 and y2 below) can be determined according to the following exemplary expression:

$$\text{Cosine}([y1], [y2]) = \frac{[y1]^T[y2]}{\|y1\|\|y2\|} \quad \text{(Expression 1)}$$

Here, y1 can be a 1×N matrix of [0, 0, 1, 1, 1, 1, ...] that represents the exemplary user A keyword profile vector of FIG. 2C, and y2 can be a 1×N matrix of [1, 1, 0, 1, 0, 1, ...] that the exemplary webpage A keyword profile vector of FIG. 2C. $[y1]^T[y2]$ can refer to the dot-product between the two matrices, while $\|y1\|$ and $\|y2\|$ may represent the magnitude of each vector. With Expression 1, a number can be determined to represent the cosine distance between the vectors y1 and y2, the distance between which can reflect a user's interest in the content of a particular webpage. For example, a smaller average value of cosine distance may indicate a higher degree of interest, while a larger average value of cosine distance may indicate a smaller degree of interest.

Similarity module 126 can determine, based on the first and second cosine distances, an aggregate score that represents an estimation of the user's interest in the content of a particular webpage. As to be discussed in more details below, similarity module 126 may also determine the score by taking into account embedding features of the user and embedding features of candidate information generated by embedding feature generation module 124. Similarity module 126 may assign the determined score with each webpage linked in candidate information database 116, and rank the webpages according to the scores. Similarity module 126 can provide the ranking information to notifications generation module 128, which can insert the link of the highest-ranked webpage in push notifications 104, and transmit push notifications 104 to user device 106, after receiving event 102.

In some embodiments, feature extraction module 120 may also select a subset of webpages linked in candidate information database 116, and further select a webpage to be linked in push notifications 104 from that subset. The subset can be selected based on the keyword profile of the user. As an example, feature extraction module 120 may determine, for each webpage linked in candidate information database 116, a set of metrics that indicate relevance of the webpage content to the keywords included in the keyword profile. The set of metrics may include, for example, term frequency, inverse document frequency, etc. Feature extraction module 120 may select a subset of webpages of which the relevance metrics exceed a predetermined threshold for the determination of the scores. A webpage can then be selected from the subset to be linked in push notifications 104 based on the determined scores.

Figure 3A:
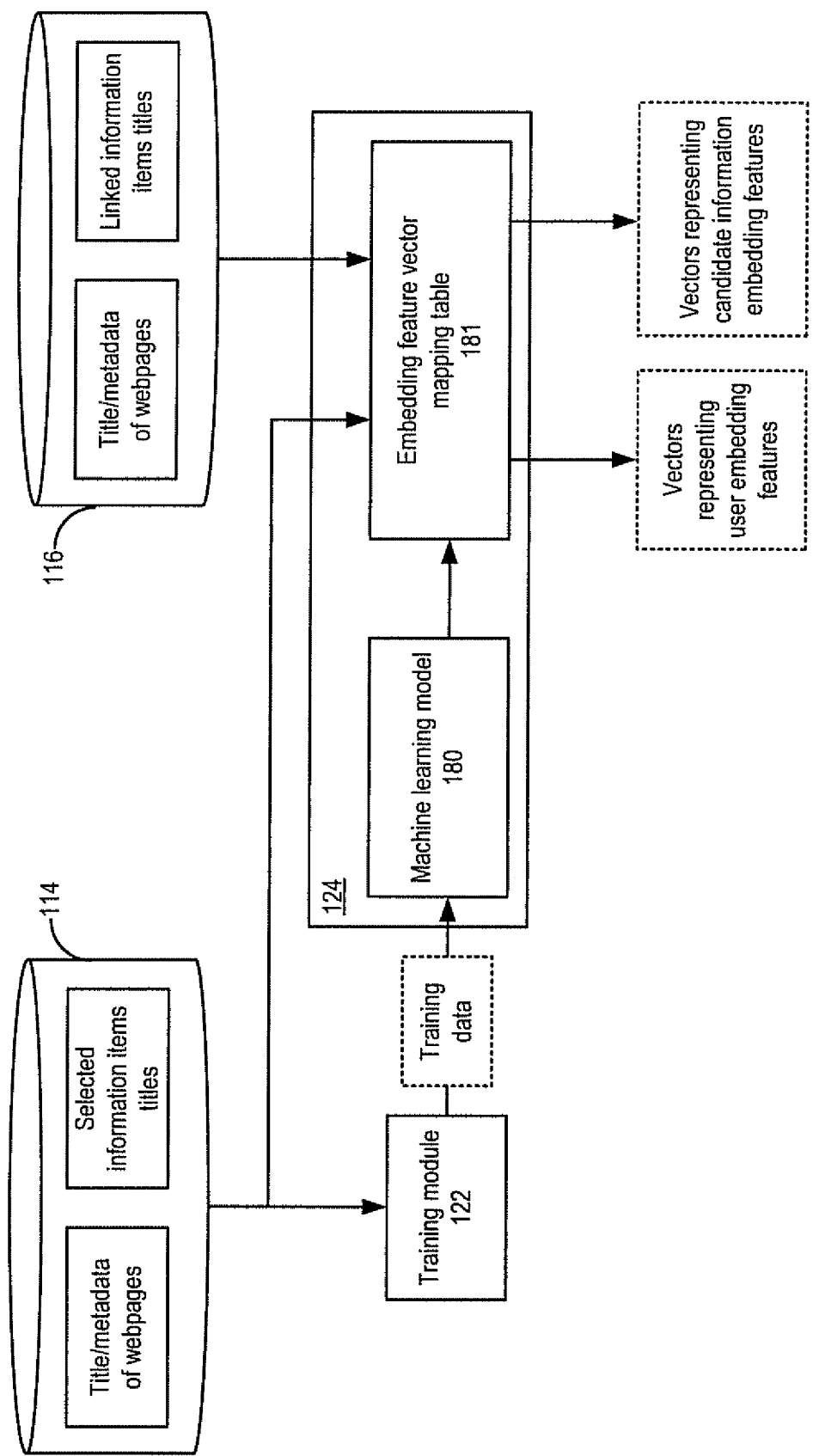
Figure 3B:
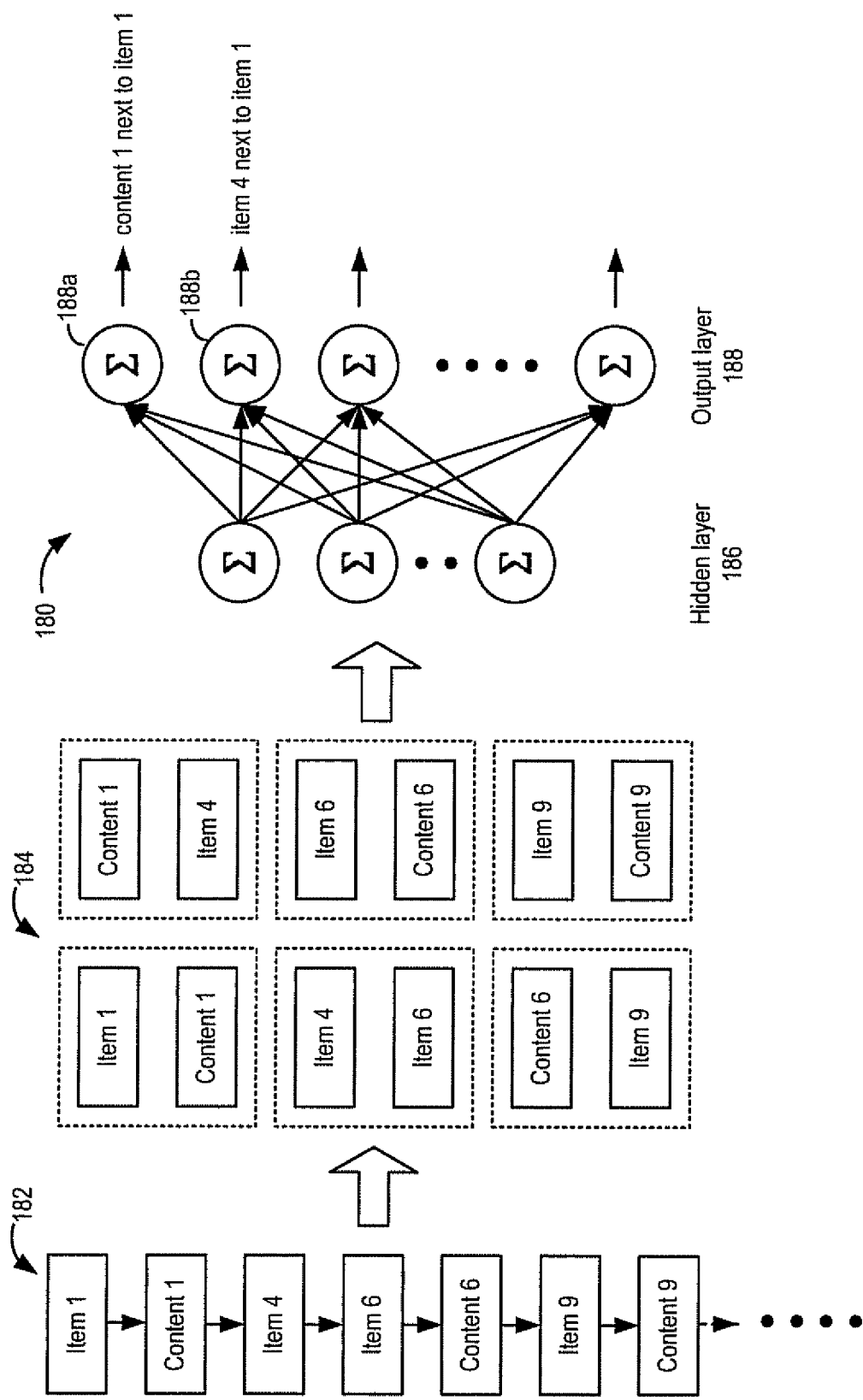

System 100 further includes training module 122 and embedding feature generation module 124 that can generate the embedding features of a user and the embedding features of candidate information. Reference is now made to FIGS. 3A-3C, which illustrate the operations of training module 122 and embedding feature generation module 124. As shown in FIG. 3A, training module 122 can retrieve history data of the user's online activities, as well as history data of other users' online activities, from accessed information database 114, and generate training data based on the history data. Training module 122 can provide the training data to embedding feature generation module 124, which includes a machine learning model 180 and an embedding feature vector mapping table 181. Machine learning model 180 can include an algorithm associated with a deep neural network model. The deep neural network can be trained using the training data provided by training module 122 to generate a set of embedding features. The embedding features can then be converted into embedding feature vector mapping table 181.

Embedding feature generation module 124 can retrieve a subset of the candidate information stored in candidate information database 116 (e.g., title/metadata of webpages linked in the database, information items linked to those webpages, etc.), and provide the subset of candidate information to embedding feature vector mapping table 181. As discussed above, the subset of the candidate information can be determined based on, for example, a set of relevance metrics determined based on the occurrence of keywords in the candidate information (e.g., term frequency, inverse document frequency). With embedding feature vector mapping table 181, embedding feature generation module 124 can generate a set of vectors representing embedding features of the subset of candidate information.

Embedding feature generation module 124 can also feed a subset of activities history data of a user stored in accessed information database 114 (e.g., title/metadata of webpages accessed by the user, information items selected by the user, etc.), and provide the subset of history data embedding feature vector mapping table 181. The subset of history data may include the most recent set of history data (e.g., history data collected in the last seven days). With embedding feature vector mapping table 181, embedding feature generation module 124 can generate a set of vectors representing embedding features of a particular user.

Referring back to FIG. 1B, embedding feature generation module 124 can provide the vectors representing the embedding features of a particular user, and the vectors representing the embedding features of the subset of candidate information, to similarity module 126. Similarity module 126 can determine a third cosine distance between the embedding features vectors, based on the aforementioned Expression 1. The third cosine distance can also reflect a degree of interest of the user in the content of the candidate information. As discussed above, the machine learning algorithm is trained to generate the embedding features by relating the candidate information with a set of activities taken by the user (e.g., selecting a particular product, a service, etc.) that occur within a predetermined timing window as when the candidate information was accessed.

Given that typically user activities can be good indicators of the user's intents and interests, the embedding features of the candidate information can provide an alternative estimation of whether a user who has selected a particular product or service will be interested in the candidate information. On the other hand, the embedding features of that user reflect what product or services the user has actually selected and can represent the interest of the user. Therefore, the third cosine distance, which represents a comparison result between the candidate information embedding features and the embedding features of that user, can provide an additional data point for estimating that user's interest in a particular piece of candidate information. Similarity module 126 may determine a weighted average of the first and second cosine distances (provided by feature extraction module 120), and of the third cosine distance, for the aggregated score used for selecting a particular piece of candidate information for push notifications generation.

FIG. 3B illustrates an exemplary machine learning model 180 and a set of exemplary training data sequence 182. Training data sequence 182 can be generated by training module 122 based on user-activities-history data stored in accessed information database 114. As shown in FIG. 3B, training data sequence 182 can include a temporal sequence of online activities performed by a user. The online activities may include, for example, accessing a webpage, selecting an information item (e.g., a product, a service, an offline activity, etc.) from the webpage, etc. As discussed above, a user may perform these online activities through an Internet browser, which may capture those activities with cookies, and provide a log of these activities to accessed information database 114 for storage. The log may also include timestamps of these activities. Training module 122 can generate the sequence of accesses for training data sequence 182 based on these timestamps. The sequence can include a set of content identifiers (e.g., "content 1") associated with a piece of content, which can be a webpage linked in accessed information database 114 and/or candidate information database 116. The sequence can also include a set of item identifiers associated with an information item referred to by a webpage linked in accessed information database 114 and/or candidate information database 116.

Training module 122 can provide subsets of training data sequenced 182 to train machine learning model 180 according to an objective function. In some embodiments, machine learning model 180 can be configured as a skip-gram model. To train the skip-gram model, training module 122 can generate a number of datasets 184 from training data sequence 182, where each dataset comprises a predetermined number of consecutive elements in the sequence.

Datasets 184 can be determined based on a sliding window scheme that moves along the sequence. For example, as shown in FIG. 3B, with a window size of 1, datasets 184 may include, for example {item 1, content 1}, {content 1, item 4}, {item 4, item 6}, etc. In a training process, each set of datasets 184 may include an element designated as a target, and an element designated as a context. For example, in a set {item 1, content 1}, an information item associated with the item identifier "item 1" can be designated as a target element, and a webpage associated with the content identifier "content 1" can be designated as a context element. In a separate training process, the roles can also be reversed, with the information item associated with "item 1" being designated as a context element and the webpage associated with "content 1" being designated as a target element Each set of datasets 184 can be represented by a multi-dimensional vector, in which each dimension corresponds to an element in training data sequence 182. FIG. 3C illustrates an exemplary table 185 that maps a set of exemplary vectors with datasets 184 illustrated in FIG. 3B. For example, the set {item 1, content 1} can be mapped to a multi-dimensional vector, in which the value for a particular dimension (e.g., item 1) can be set to one if the element associated with that dimension is present, and can be set to zero if the element associated with that dimension is absent. The multi-dimensional vectors for each set of datasets 184 can then be provided to machine learning model 180 as input for embedding features generation and training.

Referring back to FIG. 3B, machine learning model 180 can include a deep learning neural network, and includes a hidden layer 186 and an output layer 188. Hidden layer 186 includes a number of elements, each of which can store a set of scaling parameters. Each of the set of scaling parameters can be associated with a dimension of an input vector (e.g., a multi-dimensional vector as shown in FIG. 3C). Each element of the hidden layer can also store an output value computed according to the following exemplary expression:

$$E186_n = \Sigma_{i=1}(wn_i \times s_i) \qquad \text{(Expression 2)}$$

Here, $E186_n$ is the value stored in element $186_n$, of hidden layer 186, $wn_i$ is a scaling parameter associated with a particular input $s_i$, which can correspond to one of the dimensions of a multi-dimensional input vector. The scaling parameter $wn_i$ is also a part of the scaling parameters stored at element $186_n$. Each element of hidden layer can forward its output value to output layer 188. Output layer 188 of machine learning model 180 also includes a number of elements. Each of the elements of output layer 188 can also store an output value generated based on the output values of hidden layer 186. The output value at output layer 188 can be generated to provide, for example, an indication of probability of presence of a particular target element when a context element is also present. For example, output element 188a can store a value related to the probability that content 1 (a target element) is present when item 1 (a context element) is also present. Also, output element 188b can store a value related to the probability that item 4 (a target element) is present when item 1 (a context element) is also present.

The scaling parameters in hidden layer 186 can be updated as a part of the training process, to cause output layer 188 to raise some of these probabilities to indicate a larger correlation between some of the target and context elements, and to lower some of these probabilities to indicate a smaller correlation between some of the target and context elements. As an illustrative example, if datasets 184 include a relatively large number of sets of {item 1, content 1}, but a relatively small number of sets of {item 1, item 4}, the scaling parameters in hidden layer 186 can be updated to maximize the output value stored in output element 188a with respect to the output value stored in output element 188b. With such arrangements, the scaling parameters can also carry information associated with the target and context elements that can be used to indicate their correlation. As to be explained in more details below, the scaling parameters generated or updated with such a training process can be converted to a mapping table that can be used to generate embedding features of a user and of candidate information.

There are different ways to train machine learning model 180. For example, a softmax function can be used to generate a normalized probabilistic distribution for different pairings of target and context elements. A stochastic gradient descent algorithm can be used to update the scaling parameters at hidden layer 186, such that the normalized probabilistic distribution conforms to a target distribution. The target distribution can include, for example, a distribution that reflects a number of occurrences of certain pairing of target and context elements relative to other pairings. As another example, a noise-contrastive training can also be used to maximize the probability of a particular pairing (e.g., a pairing that dominates datasets 184) versus the probability of other noise pairing (e.g., pairings that occur relatively infrequently, or do not exist at all, in datasets 184).

Figure 3D:
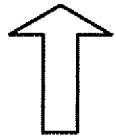

Reference is now made to FIG. 3D, which illustrates a method of generating embedding features. As shown in FIG. 3D, after the training process completes, each element of hidden layer 186 can store a set of scaling parameters $wn_i$, each of which is associated with a particular dimension in the input vector (and a particular element in training data sequence 182). For example, element 186-1 of hidden layer 186 stores a set of scaling parameters including $W1_1$ associated with item 1 and $W1_2$ associated with content 1. Further, element 186-2 of hidden layer 186 also stores a set of scaling parameters including $W2_1$ associated with item 1 and $W2_2$ associated with content 1. These parameters can be stored in, for example, a table 190, where each column is associated with a particular element of hidden layer 186.

The embedding features for a particular element (e.g., item 1, content 1, etc.) can be generated based on the scaling parameters of each row of table 190. For example, as shown in FIG. 3D, the item identifier of item 1 can be associated with a set of feature vectors comprising $W1_1$, and $W2_1$. Moreover, the content identifier of content 1 can be associated with a set of feature vectors comprising $W1_2$ and $W2_2$. The embedding features for each element can be stored in a lookup table 192, as shown in FIG. 3D.

As discussed above, the scaling parameters are generated or updated to maximize the probability indication of finding a particular target element with the presence of a particular context element, when the training data shows that the target element and the context element occur together more often than other elements. Therefore the scaling parameters can be used to describe certain embedding features of that target element and that context element which indicate their correlation.

In the case where that context element is a selected item (e.g., a product or a service selected by a user), and the target element is a piece of candidate information (e.g., a webpage accessed by that user), such correlation can also indicate a degree of the user (or some other users) in the candidate information when the user selects the item. As an illustrative example, referring back to FIG. 1A, based on the embedding features generated with machine learning model 180, system 100 can determine a degree of interest of a user in accessing a webpage that discusses a place for taking pictures of wild rabbits, if machine model 180 is trained with training data sequence 182 that indicates many users visit that webpage after purchasing a particular model of camera and accessing a webpage about wild rabbits, and the user happens to also purchase that particular model of camera and access that webpage about wild rabbits.

Referring back to FIGS. 2A and 3A, embedding feature generation module 124 can generate a set of embedding feature vectors for a user and for candidate information, using lookup table 192 of FIG. 3D. For example, embedding feature generation module 124 may extract a set of contents accessed by the user, and information items selected by the user, over a certain period of time (e.g., a most recent seven-day period). The set of contents and information items can be associated with a set of content identifiers and item identifiers. Based on the set of content identifiers and item identifiers, embedding feature generation module 124 can obtain a set of embedding feature vectors from lookup table 192, and associate the set of embedding feature vectors with the user. In some embodiments, embedding feature generation module 124 can determine a weighted average of the embedding feature vectors (extracted from lookup table 192) that correspond to the set of contents and information items accessed and selected by the user, with embedding feature vectors of more recently accessed/selected contents and information items being associated with larger weights. Embedding feature generation module 124 may also obtain the embedding feature vector of a piece of candidate information from lookup table 192 based on the content identifier associated with the piece of candidate information.

Embedding feature generation module 124 can then provide the embedding feature vectors of the user and of the candidate information to similarity module 126, which can determine the third cosine distance between the embedding features vectors, and a score that estimates the user's interest in the candidate information based on the third cosine distance (as well as the first and second cosine distances generated based on keyword and category profiles from feature extraction module 120). Notifications generation module 128 can then select a piece of candidate information to be provided in notifications 104, after receiving event 102.

Figure 4:
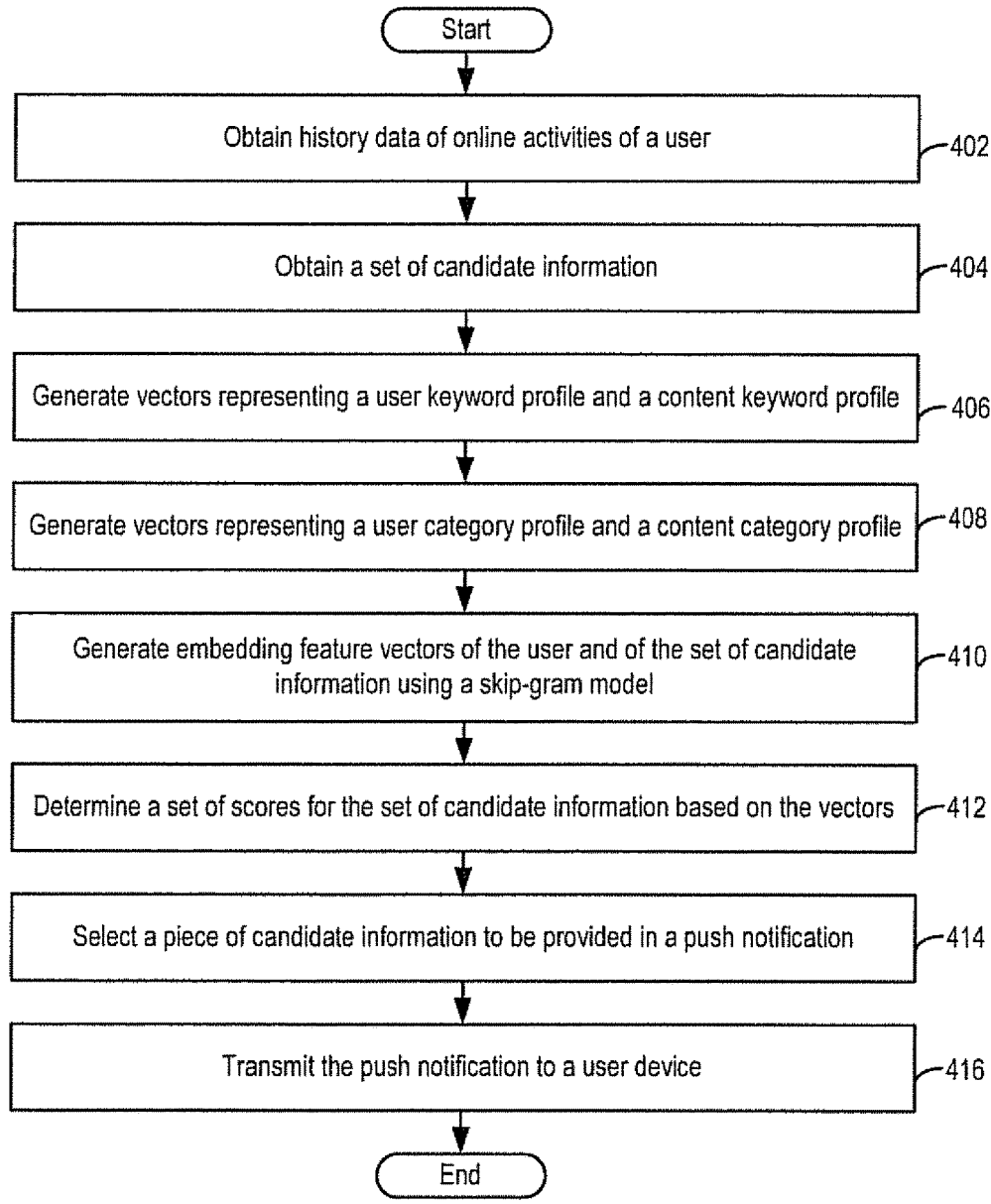
FIG. 4 is a flowchart illustrating an exemplary method of generating push notification, consistent with embodiments of the present disclosure.

FIG. 4 is a flowchart representing an exemplary method 400 for generating one or more push notifications, consistent with embodiments of the present disclosure. It will be readily appreciated that the illustrated procedure can be altered to delete steps or further include additional steps. Method 400 can be performed by a server (e.g., systems 100 of FIG. 1A) that communicates with a user device (e.g. user device 106).

After an initial start, the server obtains history data of online activities of a user, in step 402. The history data may include, for example, prior search queries, a set of previously-accessed webpages, a set of information items (e.g., a product, a service, an offline activity, etc.) selected by the user, etc. The server may obtain the history data from search queries database 112 and accessed information database 114 of FIG. 1B.

The server then obtains a set of candidate information to be selected in the push notifications, in step 404. The candidate information can include, for example, titles, metadata, content, etc. associated with a set of webpages that are potentially of interest to a particular user, as well as information items (e.g., product, service, off-line activities) referred to by the set of webpages. The candidate information can be obtained from candidate information database 116 of FIG. 1B. In some embodiments, the server may obtain a subset of candidate information stored in candidate information database 116. The subset can be determined based on, for example, a set of relevance metrics determined based on the occurrence of certain keywords in the candidate information (e.g., term frequency, inverse document frequency), and the keywords can be extracted from prior search queries of the user obtained in step 402.

The server then generates a user keyword profile and a content keyword profile, and generates vector representing the user keyword profile and the content keyword profile, in step 406. The user keyword profile can be generated by extracting keywords from the search queries, information items selected by the user, the titles or metadata of webpages visited by the user, etc. The content keyword profile can also be generated by extracting keywords from the candidate information, such as the titles or metadata of webpages, the information items linked to those webpages, etc. The extraction can include parsing the text data and then generating word segmentations from the parsed text data using conditional random fields. The server also associates the extracted keywords with the user and with the candidate information to generate the keyword profiles, and generate multi-dimensional vectors similar to those illustrated in FIG. 2C to represent the keyword profiles.

The server then generates a user category profile and a content category profile, and generates vector representing the user category profile and the content category profile, in step 408. The user category profile can include a set of predetermined categories associated with the titles of information items accessed by the user. The content category file can also include a set of predetermined categories discussed or linked in the candidate information (e.g., a webpage). Each user can be associated with a user category profile. Moreover, each piece of candidate information (e.g., a webpage) included in candidate information database can be associated with a content category profile. The category profiles can be generated based on, for example, mapping the keyword profiles, tags, etc. to a set of predetermined categories. The category profiles can also be generated by a category classifier. The server also associates the user and the candidate information with the determined categories to generate the category profiles, and generate multi-dimensional vectors similar to those illustrated in FIG. 2C to represent the category profiles. In some embodiments, steps 402 to 408 can be performed by, for example, feature extraction module 120 of FIG. 1B.

The server then generates embedding feature vectors of the user and of the set of candidate information using a skip-gram model, in step 410. The skip-gram model can be a deep neural network model (e.g., machine learning model 180 of FIG. 3B) trained based on a historical sequence of activities by the user and by other users (e.g., training data sequence 182 of FIG. 3B). During the training process, the hidden layer parameters can be updated to reflect a probability of occurrence of a target element when a context element is present, based on co-occurrence of pairing of elements extracted from the historical sequence. The embedding feature vectors of an information item, or a piece of content, can be generated based on a combination of the hidden layer parameters, and can be stored in a lookup table (e.g., lookup table 192 of FIG. 3D). The server can retrieve the embedding feature vectors for a user based on the content identifiers of a set of contents the user has accessed, and the item identifiers of a set of information items the user has selected, over a certain time period, from lookup table 192. The server can also retrieve the embedding feature vector for a piece of candidate information from lookup table 192, based on its associated content identifier. In some embodiments, step 410 can be performed by training module 122 and embedding feature generation module 124 of FIG. 1B.

The server can then determine a set of scores for the set of candidate information based on the vectors, in step 412. The scores can estimate a user's degree of interest in the set of candidate information. The scores can be determined based on, for example, a weighted sum of a first cosine distance between the vectors representing the user and content keyword profiles, a second cosine distance between the vectors representing the user and content category profiles, and a third cosine distance between the embedding feature vectors of the user and the candidate information. In some embodiments, step 412 can be performed by similarity module 126 of FIG. 1B.

The server can then select a piece of candidate information to be provided in the push notifications, in step 414. The selection can be based on the set of scores determined in step 412. For example, the server may select the piece of candidate information associated with a maximum score, which indicates that the user is most likely to be interested in the candidate information, and include the selected information in the push notifications. The server can then transmit the push notifications to the user device, in step 416. In some embodiments, the transmission of the push notifications can be triggered by detection of an event, which can be, for example, expiration of a timer, a change of operation status of a user device (e.g., powered on, user logged on, etc.). In some embodiments, steps 414 and 416 can be performed by notifications generation module 128 of FIG. 1B.

Figure 5:
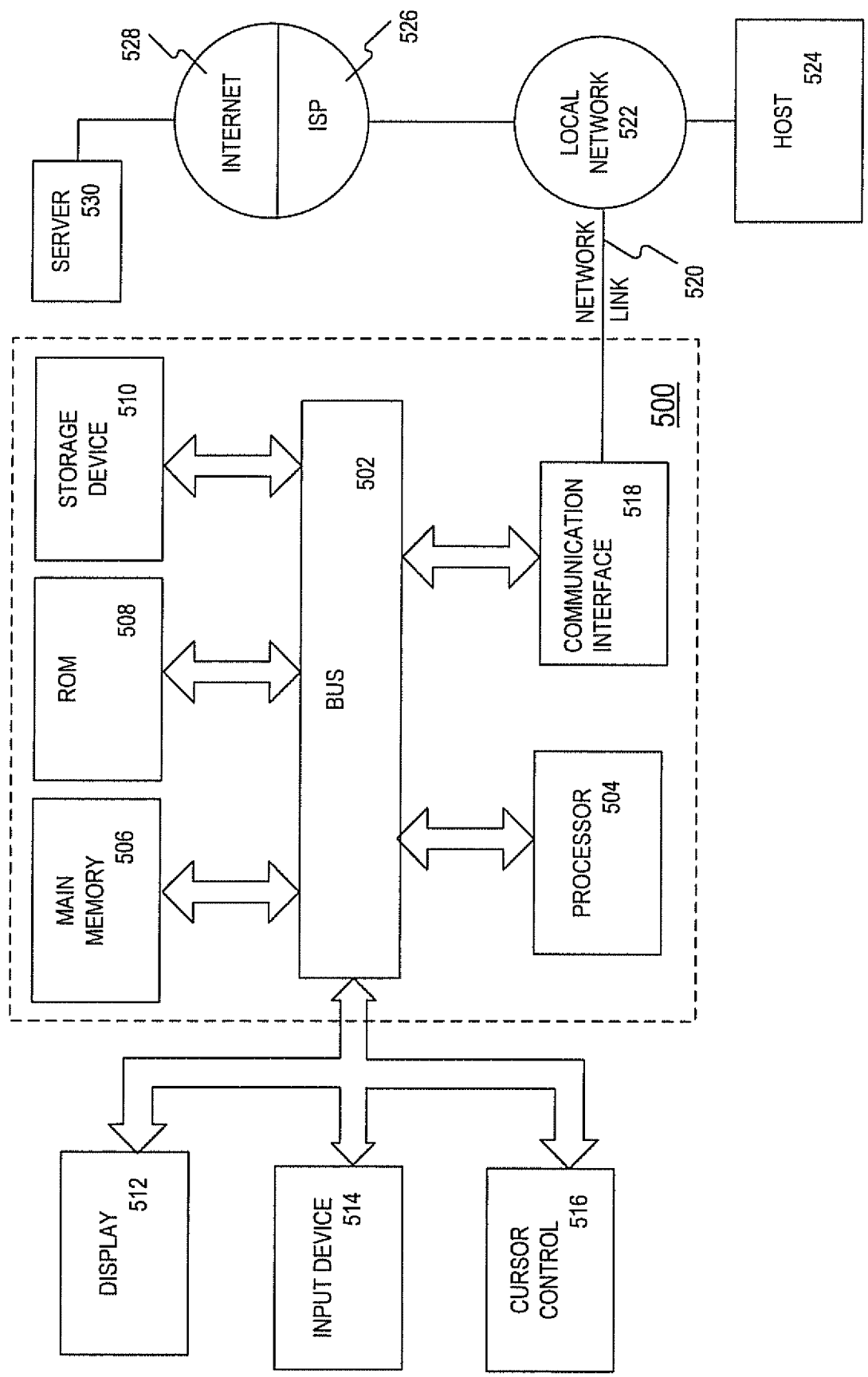
FIG. 5 is a block diagram illustrating an exemplary computer system on which embodiments described herein can be implemented.

FIG. 5 is a block diagram of an exemplary computer system 500 with which embodiments described herein can be implemented. Computer system 500 includes a bus 502 or other communication mechanism for communicating information, and one or more hardware processors 504 (denoted as processor 504 for purposes of simplicity) coupled with bus 502 for processing information. Hardware processor 504 can be, for example, one or microprocessors.

Computer system 500 also includes a main memory 506, such as a random access memory (RAM) or other dynamic storage device, coupled to bus 502 for storing information and instructions to be executed by processor 504. Main memory 506 also can be used for storing temporary variables or other intermediate information during execution of instructions to be executed by processor 504. Such instructions, after being stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 100 can be coupled via bus 502 to a display 512, such as a cathode ray tube (CRT), an liquid crystal display (LCD), or a touch screen, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 500 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables. The modules may include, for example, components of system 100 of FIG. 1B and system 300 of FIG. 3.

Computer system 500 can implement the techniques described herein using customized hard-wired logic, one or more ASICs or FPGAs, firmware and/or program logic which in combination with the computer system causes or programs computer system 500 to be a special-purpose machine. According to some embodiments, the operations, functionalities, and techniques and other features described herein are performed by computer system 500 in response to processor 504 executing one or more sequences of one or more instructions contained in main memory 506. Such instructions can be read into main memory 506 from another storage medium, such as storage device 510. Execution of the sequences of instructions contained in main memory 506 causes processor 504 to perform the method steps (e.g., method 400 of FIG. 4) described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 510. Volatile media can include dynamic memory, such as main memory 506. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 502. Transmission media can also take the form of acoustic or light waves, such as those generated during radio-wave and infra-red data communications.

Various forms of media can be involved in carrying one or more sequences of one or more instructions to processor 504 for execution. For example, the instructions can initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 can optionally be stored on storage device 510 either before or after execution by processor 504.

Computer system 500 can also include a communication interface 518 coupled to bus 502. Communication interface 518 can provide a two-way data communication coupling to a network link 520 that can be connected to a local network 522. For example, communication interface 518 can be an integrated services digital network (ISDN) card, cable modem, satellite modem, or a modem to provide a data communication connection to a corresponding type of telephone line. As another example, communication interface 518 can be a local area network (LAN) card to provide a data communication connection to a compatible LAN. Wireless links can also be implemented. In any such implementation, communication interface 518 can send and receive electrical, electromagnetic or optical signals that carry digital data streams representing various types of information.

Network link 520 can typically provide data communication through one or more networks to other data devices. For example, network link 520 can provide a connection through local network 522 to a host computer 524 or to data equipment operated by an Internet Service Provider (ISP) 526. ISP 526 in turn can provide data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, can be example forms of transmission media.

Computer system 500 can send messages and receive data, including program code, through the network(s), network link 520 and communication interface 518. In the Internet example, a server 530 can transmit a requested code for an application program through Internet 528, ISP 526, local network 522 and communication interface 518.

The received code can be executed by processor 504 as it is received, and/or stored in storage device 510, or other non-volatile storage for later execution. In some embodiments, server 530 can provide information for being displayed on a display.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method performed by one or more servers having one or more processors for generating one or more push notifications to a user device, the method comprising:
    obtaining history data representing a history of online activities of a user;
    obtaining candidate data representing a set of candidate information to be selected in one or more push notifications to the user;
    generating, based on the history data and the candidate data, user profile vectors representing a user profile associated with the user and content vectors representing a set of content profiles associated with the set of candidate information;
    generating, by using a neural network, embedding user feature vectors of the user and embedding content feature vectors of the set of candidate information based on the history data and the candidate data, wherein the embedding user feature vectors are generated based on one or more items the user selects within a predetermined time period, and the embedding content feature vectors are generated based on one or more content identifiers associated with the set of candidate information;
    determining a first distance between the user profile vectors and the content vectors;

determining a second distance between the embedding user feature vectors and the embedding content feature vectors;

selecting first candidate information from the set of candidate information based on a weighted combination of the first and second distances; and providing for transmission information for one or more push notifications including the first candidate information to a user device associated with the user.

2. The method of claim 1, wherein the user profile includes a user keyword profile and a user category profile;
wherein the user keyword profile is generated based on keywords extracted from the history data including at least one of: prior search queries of the user, title and metadata of a first set of webpages previously visited by the user, and title of a first set of information items previously selected by the user;
wherein the user category profile is generated by associating a first set of predetermined categories to at least some of the history data.

3. The method of claim 1, wherein the set of content profiles include a set of content keyword profiles and set of content category profiles;
wherein the set of content keyword profiles are generated based on keywords extracted from the second data including at least one of: titles and metadata of a second set of webpages linked to the candidate information database, and title of a second set of information items linked to the second set of webpages;
wherein the set of content category profiles are generated by associating a second set of predetermined categories with at least some of the candidate data.

4. The method of claim 1, wherein the neural network is trained with a history of online activities of a plurality of users tracked by the one or more servers;
wherein the neural network includes a deep neural network model including a hidden layer configured as a skip-gram model; and
wherein the embedding user feature vectors of the user and embedding content feature vectors are generated based on scaling parameters associated with the hidden layer.

5. The method of claim 4, further comprising: training the skip-gram model using pairings of target and context elements generated from a data sequence of content access and information item selection;
wherein the skip-gram model is trained to provide a probability value of occurrence of a target element when a context element is present; and
wherein the scaling parameters are updated during the training to generate the probability value according to a distribution of the pairings of target and context elements.

6. The method of claim 4, wherein generating embedding user feature vectors of the user and embedding content feature vectors of the set of candidate information comprises:
creating, based on the scaling parameters, a lookup table that maps the history data and the candidate data to a set of embedding feature vectors; and
obtaining the embedding user feature vectors and the embedding content feature vectors from the lookup table.

7. The method of claim 1, wherein determining a first distance between the user profile vectors and the content vectors and a second distance between the embedding user feature vectors and the embedding content feature vectors comprises:
determining a first set of cosine distances between the user profile vectors and the content vectors;
determining a second set of cosine distances between the embedding user feature vectors and the embedding content feature vectors;
determining a set of scores for the set of candidate information based on weighted sums of the first and second set of cosine distances; and
ranking the set of candidate information according to the set of scores;
wherein the first candidate information is selected from the set of candidate information based on a result of the ranking.

8. An apparatus for generating one or more push notifications to a user device, the apparatus comprising:
a memory storing a set of instructions; and
one or more processors configured to execute the set of instructions to cause the apparatus to:
obtain history data representing a history of online activities of a user;
obtain candidate data representing a set of candidate information to be selected in one or more push notifications to the user;
generate, based on the history data and the candidate data, user profile vectors representing a user profile associated with the user and content vectors representing a set of content profiles associated with the set of candidate information;
generate, by using a neural network, embedding user feature vectors of the user and embedding content feature vectors of the set of candidate information based on the history data and the candidate data, wherein the embedding user feature vectors are generated based on one or more items the user selects within a predetermined time period, and the embedding content feature vectors are generated based on one or more content identifiers associated with the set of candidate information;
determine a first distance between the user profile vectors and the content vectors and a second distance between the embedding user feature vectors and the embedding content feature vectors;
select first candidate information from the set of candidate information based on a combination of the first and second distances; and
provide for transmission information for one or more push notifications including the first candidate information to a user device associated with the user.

9. The apparatus of claim 8, wherein the user profile includes a user keyword profile and a user category profile;
wherein the user keyword profile is generated based on keywords extracted from the history data including at least one of: prior search queries of the user, title and metadata of a first set of webpages previously visited by the user, and title of a first set of information items previously selected by the user;
wherein the user category profile is generated by associating a first set of predetermined categories to at least some of the history data.

10. The apparatus of claim 8, wherein the set of content profiles include a set of content keyword profiles and set of content category profiles;
wherein the set of content keyword profiles are generated based on keywords extracted from the second data including at least one of: titles and metadata of a second set of webpages linked to the candidate information database, and title of a second set of information items linked to the second set of webpages;

wherein the set of content category profiles are generated by associating a second set of predetermined categories with at least some of the candidate data.

11. The apparatus of claim 8, wherein the neural network is trained with a history of online activities of a plurality of users tracked by the one or more servers;

wherein the neural network includes a deep neural network model including a hidden layer configured as a skip-gram model; and wherein the embedding user feature vectors of the user and embedding content feature vectors are generated based on scaling parameters associated with the hidden layer.

12. The apparatus of claim 11, wherein the one or more processors are further configured to execute the set of instructions to cause the apparatus to train the skip-gram model using pairings of target and context elements generated from a data sequence of content access and information item selection;

wherein the skip-gram model is trained to provide a probability value of occurrence of a target element when a context element is present; and wherein the scaling parameters are updated during the training to generate the probability value according to a distribution of the pairings of target and context elements.

13. The apparatus of claim 11, wherein the one or more processors are further configured to execute the set of instructions to cause the apparatus to:

create, based on the scaling parameters, a lookup table that maps the history data and the candidate data to a set of embedding feature vectors; and obtain the embedding user feature vectors and the embedding content feature vectors from the lookup table.

14. The apparatus of claim 8, wherein the one or more processors are further configured to execute the set of instructions to cause the apparatus to:

determine a first set of cosine distances between the user profile vectors and the content vectors;

determine a second set of cosine distances between the embedding user feature vectors and the embedding content feature vectors;

determine a set of scores for the set of candidate information based on weighted sums of the first and second set of cosine distances; and rank the set of candidate information according to the set of scores;

wherein the first candidate information is selected from the set of candidate information based on a result of the ranking.

15. A non-transitory computer readable medium that stores a set of instructions that is executable by at least one hardware processor of an apparatus to cause the apparatus to perform a method of generating one or more push notifications to a user device, the method comprising:

obtaining history data representing a history of online activities of a user;

obtaining candidate data representing a set of candidate information to be selected in one or more push notifications to the user;

generating, based on the first and second data, user profile vectors representing a user profile associated with the user and content vectors representing a set of content profiles associated with the set of candidate information;

generating, by using a neural network, embedding user feature vectors of the user and embedding content feature vectors of the set of candidate information based on the history data and the candidate data, wherein the machine learning model is trained with a history of online activities of a plurality of users tracked by the one or more servers, wherein the embedding user feature vectors are generated based on one or more items the user selects within a predetermined time period, and the embedding content feature vectors are generated based on one or more content identifiers associated with the set of candidate information;

determining a first distance between the user profile vectors and the content vectors and a second distance between the embedding user feature vectors and the embedding content feature vectors;

selecting first candidate information from the set of candidate information based on a weighted combination of the first and second distances; and providing for transmission information for one or more push notifications including the first candidate information to a user device associated with the user.

16. The medium of claim 15, wherein the user profile includes a user keyword profile and a user category profile;

wherein the user keyword profile is generated based on keywords extracted from the history data including at least one of: prior search queries of the user, title and metadata of a first set of webpages previously visited by the user, and title of a first set of information items previously selected by the user;

wherein the user category profile is generated by associating a first set of predetermined categories to at least some of the history data.

17. The medium of claim 15, wherein the set of content profiles include a set of content keyword profiles and set of content category profiles;

wherein the set of content keyword profiles are generated based on keywords extracted from the candidate data including at least one of: titles and metadata of a second set of webpages linked to the candidate information database, and title of a second set of information items linked to the second set of webpages;

wherein the set of content category profiles are generated by associating a second set of predetermined categories with at least some of the candidate data.

18. The medium of claim 15, wherein the neural network is trained with a history of online activities of a plurality of users tracked by the one or more servers;

wherein the neural network includes a deep neural network model including a hidden layer configured as a skip-gram model;

wherein the skip-gram model is trained using a data sequence of content access and information item selection generated from a data sequence of content access and information item selection;

wherein the skip-gram model is trained by updating a set of scaling parameters associated with the hidden layer to provide a probability value of occurrence of a target element when a context element is present according to a distribution of the pairings of target and context elements; and wherein the embedding user feature vectors of the user and embedding content feature vectors are generated based on scaling parameters associated with the hidden layer.

19. The medium of claim 18, wherein generating embedding user feature vectors of the user and embedding content feature vectors of the set of candidate information comprises the medium storing instructions to cause the at least one hardware processor of the apparatus to perform:

creating, based on the scaling parameters, a lookup table that maps the history data and the candidate data to a set of embedding feature vectors; and obtaining the embedding user feature vectors and the embedding content feature vectors from the lookup table.

20. The medium of claim 15, wherein determining a first distance between the user profile vectors and the content vectors and a second distance between the embedding user feature vectors and the embedding content feature vectors comprises the medium storing instructions to cause the at least one hardware processor of the apparatus to perform:

determining a first set of cosine distances between the user profile vectors and the content vectors;

determining a second set of cosine distances between the embedding user feature vectors and the embedding content feature vectors;

determining a set of scores for the set of candidate information based on weighted sums of the first and second set of cosine distances; and ranking the set of candidate information according to the set of scores;

wherein the first candidate information is selected from the set of candidate information based on a result of the ranking.

* * * * *